United States Patent Office 3,256,135
Patented June 14, 1966

3,256,135
EPOXY ADHESIVE
Herbert C. Weinheimer, Bainbridge, N.Y., Elizabeth A. Blommers, Abington, Pa., and Samuel Loshaek, Stamford, Conn., assignors to The Borden Company, New York, N.Y., a corporation of New Jersey
No Drawing. Filed June 22, 1962, Ser. No. 204,644
12 Claims. (Cl. 161—185)

This invention relates to an epoxy adhesive and its use on surfaces of aluminum or the like to impart resistance of the adhesive bond to ocean water or other saline solution.

The use of alkali metal chromates applied in aqueous solutions to metal surfaces, to decrease corrosion thereof, is well known. So also is the dispersion of chromates that are insoluble in the drying oils as pigments in oil paints.

The present invention provides an adhesive that, when applied and cured between previously cleaned surfaces of aluminum panesl, develops an adhesive bond that retains satisfactory shearing strength after severe exposure to salt water.

Briefly stated the invention comprises the herein described adhesive composition and combinations thereof with metal surfaces bonded by the adhesives. More particularly, the composition of the invention comprises an epoxy resin and a polyvalent metal chromate dispersed therein, the chromate being one that is appreciably soluble in the resin and insoluble in water.

The epoxy resin used is any one of those that is conventional in making socalled epoxy adhesives. Examples are the glycidyl ethers of the following hydroxy or thio compounds: condensation products of formaldehyde with phenol or resorcinol suitably of low molecular weight such as that of the dimers and trimers; bisphenol-A, i.e., 2-2′-bis(p-hydroxyphenyl) propane; tetraphenoxy ethane; glycerine; and polyethylene or other poly(alkylenepolysulfide) resins such as "Thiokol." Specific examples of the epoxy resins that we can use are the following commercial materials: epoxidized novolak resin (Epiphen 825) containing about 1 epoxy group for 90 parts by weight of the novolak, epoxidized glycerol (Epon 562) and epoxidized bisphenol A (Epon 828). In each case the glycidyl ether used contains at least 2 epoxy units —$C_2H_4O$— per molecule. The chromate is any di or other polyvalent metal chromate that is stable under the conditions of use, insoluble in water and soluble in the selected epoxy resin, i.e., soluble therein to the extent of causing coloration of a solution of the resin after any undissolved chromate present has been separated by settling. The test for solubility in the resin is made by stirring the mixture of resin and chromate with toluene or acetone (inert diluents that are non-solvents for the chromate but solvents for the resin), allowing the whole to settle, and noting the color of the clear liquor. The chromate used should be substantially free from alkali metal chromates, e.g., below 1% thereof. When present in significant amounts sodium chromate, for example, in the epoxy resin adhesive decreases water resistance and causes excessive loss of bond strength in the salt spray test. Examples of chromates that we use are zinc and lead chromate. We know of no advantage of substituting for them other higher priced chromate of the solubility requirement stated, such as copper chromate. The dichromates are unsatisfactory because of instability or water solubility or both.

As the converter or agent added to cause curing of the epoxy resin, we use one or a mixture of the curing agents commonly employed with epoxy resins. Examples are the $C_2$–$C_{10}$ polyamines such as m-xylylene diamine, diethylene triamine, 2,4,6-tri(dimethyl aminomethyl) phenol, tetraethylene pentamine, an amine-terminated condensate of polyamines and dimerized fatty acids (Versamid 140), tertiary aliphatic amines such as diethylaminoethanol and mixtures thereof.

Flexibilizers to be used are those that are conventional in epoxy resins and adhesives. The flexibilizer must be compatible with the epoxy resin at all temperatures of use of the adhesive and substantially non-volatile, i.e., at room temperature. Examples are poly(ethylene polysulfide), epoxidized glycerol with 2–3 epoxy groups per mole, Cardolite NC–513, the product of epoxidation of the condensation product of plasticizer grade of formaldehyde with cashew nut oil, and monoepoxy phenol.

Fillers of usual kind may be incorporated. These are materials in powder form that are insoluble in and essentially inert chemically to the epoxy resins and water. They include chromic oxide, ground mica, an example of which is Mineralite 4X, aluminum flake dust, diatomaceous earth, and insoluble metal silicates.

The material of any class given above may be used alone or mixed with others of the same class.

Proportions of the several classes of materials that are permissible and also those recommended are shown in the following table.

| Material | Parts by Weight for 100 Parts of Epoxy Resin | |
|---|---|---|
| | Permissible | Recommended |
| Polyvalent metal chromate | 2–40 | 5–16 |
| Curing agent | 10–30 | 3–20 |
| Flexibilizer | 0–30 | 1–15 |
| Filler | 0–50 | 20–35 |

As to conditions, the surfaces to be bonded are prepared in a manner satisfactory for bonding with usual epoxy adhesives into assemblies that are not to be exposed to salt water. Thus aluminum surfaces are degreased by a grease solvent, e.g., trichloroethylene, ethylene dichloride, acetone or the like. They can also be etched by being suitably immersed in a hot solution of potassium dichromate in diluted sulfuric acid, washed with water, dried and maintained in grease-free condition until the adhesive is applied.

The thickness of the adhesive layer applied between the surfaces may be varied, as within the range 0.001–0.005 and ordinarily about 0.002 to 0.003 inch. After the glue has been applied, the thus treated surfaces are pressed together strongly as at 7–50 p.s.i., 10 p.s.i. being adequate. Then the adhesive is cured as by holding the assembly under pressure until the bond is developed. Room temperature is satisfactory as, for example, temperatures of about 60°–100° F. over a period of 24 hours. The pressure is then released.

The epoxy resin mixture including the chromate soluble therein is mixed with the amine or other curing agent and with the epoxy resin composition shortly before being applied to the cleaned surfaces.

The length of holding of the mixed epoxy resin composition and amine converter has an effect on the tensile shear strength of the product bonded with the adhesive. As the adhesive is held longer in the pot, the composition undergoes some presetting which interferes with the development of full strength between the surfaces to be bonded.

The invention will be further illustrated by description in connection with the following examples of the practice of it. In these examples and elsewhere herein proportions are expressed as parts by weight except where stated specifically to the contrary.

Example 1

The surfaces bonded were "Alclad," i.e., aluminum-faced alloy, the exact composition of the alloy constituting the core having no substantial effect on the bonding of the adhesive to the aluminum faces. The plates were first cleaned by being degreased with trichloroethylene, then immersed for 10 minutes at 151°–157° F. in a solution containing 30 parts by weight of water, 10 of sulfuric acid (specific gravity 1.84), and 1 part of sodium dicromate, next rinsed in tap water, and finally air dried.

The epoxy resin adhesive was mixed with the amine curing agent and the whole spread upon surfaces to be adhered, as layers about 0.01 inch thick. The plates were then pressed together to form a lap joint of ½ inch width. A pressure of 10 p.s.i. was then applied at a temperature of 73° F., for a period of 24 hours. Satisfactory strength was obtained when the bond was heat cured for 30 minutes at 212° F. but a heat cure of 2 hours at 212° F. raised the tensile shear strength when tested at 67° F. from about 2,000 to about 2500 p.s.i.

More specifically, the composition of the adhesive as made in two parts was as follows:

The epoxy resin was the product of epoxidation of novolak in usual manner. The novolak had been prepared by acid catalyzed condensation of 1 mole of phenol with about 0.85 mole of formaldehyde. The proportion of epichlorohydrin supplied for the epoxidation was about 4 moles to 1 mole of phenol represented in the novolak, sodium hydroxide was the alkali used to accept the hydrogen chloride liberated, and the excess epichlorohydrin was distilled away at the end. The epoxidized novolak had 1 epoxy group for roughly 1 mole of phenol represented in the novolak.

| Component— | Parts by weight |
|---|---|
| Part I: | |
| Epoxidized novolak | 20 |
| Epon 562 (epoxidized glycerine with 2 epoxy groups per mole of glycerol), as flexibilizer | 5 |
| Ethylene polysulfide rubber, i.e., Thiokol LP-3, flexibilizer | 3 |
| Zinc chromate (free from sodium chromate) | 2 |
| Pulverized mica (Mineralite 4X), filler | 8 |
| Part II: | |
| Diethylaminoethanol | 3.0 |
| Tetraethylene pentamine | 1.4 |

Parts I and II were mixed at room temperature. The adhesive was then spread promptly upon the metal surfaces to be bonded, the surfaces pressed together, and the bond cured for 5 days at 73° F. under a pressure of 10 p.s.i.

In a control preparation the chromate was omitted, for comparative purposes only.

| Formulation | Cleaning of Aluminum | Tensile Shear Strength, p.s.i. (Av.) | |
|---|---|---|---|
| | | Cured Only | After 250 Hours' Exposure to Salt Spray |
| With ZnCrO₄ | Degreasing | 1,600 | 1,300 |
| No ZnCrO₄ | ----do---- | 1,500 | 0 |
| With ZnCrO₄ | Degreasing with acid dichromate. | 2,900 | 3,000 |
| No ZnCrO₄ | ----do---- | 2,600 | 200-2,600 |

Example 2

The composition and procedure of Example 1 are used except that the epoxidized novolak was replaced by an equal weight of epoxidized bisphenol A and the zinc chromate was replaced by 3 parts of lead chromate. The physical properties of the bonded surfaces were substantially as in Example 1. It was noted however that the lead chromate showed some advantage in being more readily dispersible in the adhesive composition than was the zinc chromate.

Example 3

The procedure and composition of Example 1 were used except that the tetraethylene pentamine was replaced by 2.5 parts of m-xylylene diamine. When the Parts I and II were mixed, this adhesive showed a pot life of only 40–50 minutes but gave a tensile shear strength test of 2000 p.s.i.

In a modification of this example the curing agent is each of the other polyamines disclosed above in the amount of 2.5 parts, used separately and in turn.

Example 4

The procedure of Example 1 was used except that the composition of the two parts of the adhesive are as follows:

| Component— | Parts by weight |
|---|---|
| Part I: | |
| Epoxidized bisphenol A | 20 |
| Lead chromate | 4 |
| Ground mica filler | 6 |
| Part II: | |
| Diethylaminoethanol | 2.0 |
| 2,4,6-tri(dimethyl aminomethyl) phenol | 1.0 |

Example 5

The procedure of Example 1 was followed but the composition was as follows:

| Part I: | Parts by weight |
|---|---|
| Epiphen 825 | 20 |
| Epon 562 | 5 |
| Mineralite 4X | 26 |
| Lead chromate | 4 |
| Part II: | |
| Diethylaminoethanol | 3.0 |
| Tetraethylene pentamine | 1.3 |

This adhesive when cured between chromate-cleaned aluminum panels showed a tensile shear strength at 73° F. of 1,700 p.s.i. and at 300° F. about 1,000 p.s.i. The salt spray resistance was significant, the tensile shear strength after 30 days' salt spray exposure of the bond being 2,000 p.s.i. at 73° F.

While the adhesive is intended primarily for bonding aluminum surfaces, it is applicable also to other materials which are to be adhered, e.g., iron, steel, silver, glass, and phenolic or melamine resin laminates.

It will be understood that it is intended to cover all changes and modifications of the examples of the invention herein chosen for the purpose of illustration which do not constitute departures from the spirit and scope of the invention.

We claim:
1. A laminate structure comprising:
   (1) surfaces selected from the group consisting of metals, glass, phenolic resins, and melamine resins, and
   (2) an adhesive composition disposed as a bonding layer between overlapping parts of said surfaces comprising in combination:
      (a) an epoxy resin having at least two glycidyl ether groups for each mole of the resin;
      (b) a curing agent therefor;
      (c) a polyvalent metal chromate dispersed in the resin and in part at least dissolved therein, the said chromate being insoluble in water;
      (d) the proportions being 2–40 parts of the metal chromate for 100 parts of the resin; and

(e) said adhesive being in cured condition and remaining effective as a bonding medium after exposure to salt water.

2. A laminate structure comprising:
(1) surfaces selected from the group consisting of metals, glass, phenolic resins, and melamine resins, and
(2) an adhesive composition disposed as a bonding layer between overlapping parts of said surfaces comprising in combination:
   (a) an epoxy resin having at least two glycidyl ether groups for each mole of the resin;
   (b) a curing agent therefor;
   (c) a chromate selected from the group consisting of lead, zinc, and copper chromates dispersed in the resin;
   (d) the proportions being 2–40 parts of the chromate for 100 parts of the resin; and
   (e) said adhesive being in cured condition remaining effective as a bonding medium after exposure to salt water.

3. The laminate structure of claim 2 wherein said metal is selected from the group consisting of aluminum, aluminum containing alloys, iron, steel, and silver.

4. The laminate structure of claim 2 wherein said chromate is lead chromate.

5. The laminate structure of claim 2 wherein said curing agent is a mixture of $C_2$–$C_{10}$ polyamine and a tertiary aliphatic amine.

6. The laminate structure of claim 2 wherein said epoxy resin is selected from the group consisting of a glycidyl ether of a compound selected from the group consisting of:
   (1) condensation products of formaldehyde with phenol, 2,2′-bis(p-hydroxyphenyl) propane, and resorcinol; and
   (2) poly(ethylene polysulfide), said ether having at least two epoxy groups per mole.

7. The laminate structure of claim 2 wherein said epoxy resin is epoxidized novolak.

8. The laminate structure of claim 2 wherein said epoxy resin is the product of epoxidation of a phenol formaldehyde condensation product.

9. The laminate structure of claim 2 including an admixed flexibilizer for said resin, the flexibilizer being poly(ethylene polysulfide).

10. The laminate structure of claim 2 including an admixed flexibilizer for said resin, the flexibilizer being epoxidized glycerol having at least 2 epoxy groups per 1 mole of glycerol.

11. The laminate structure claim 2 including an admixed flexibilizer for said resin, the flexibilizer being monoepoxy phenol.

12. An assembly comprising:
(1) sheets having aluminum faces; and
(2) an adhesive composition disposed as a bonding layer between overlapping parts of said sheets comprising in combination:
   (a) 100 parts of an epoxidized novolak having at least 2 expoxy groups per mole;
   (b) 2–40 parts of zinc chromate;
   (c) 3–12 parts of a mixture of tetraethylene pentamine and diethylaminoethanol as curing agent;
   (d) 1–10 parts of monoepoxy phenol as flexibilizer;
   (e) 10–60 parts of mica powder as filler; and
   (f) said adhesive being in cured condition and remaining effective as a bonding medium after exposure to salt water.

References Cited by the Examiner

UNITED STATES PATENTS

| | | | |
|---|---|---|---|
| 2,731,437 | 1/1956 | Bender et al. | 260—42 |
| 2,787,608 | 4/1957 | Gregory et al. | 260—42 |
| 2,789,958 | 4/1957 | Fettes et al. | 260—42 |
| 2,801,989 | 8/1957 | Farnham | 260—42 |
| 2,828,236 | 3/1958 | West | 161—186 |
| 2,866,768 | 12/1958 | Bolstad | 260—37 |
| 2,871,217 | 1/1959 | Howard | 260—42 |
| 2,964,496 | 12/1960 | Newland et al. | 260—45.75 |
| 3,138,618 | 6/1964 | Nikles et al. | 260—37 |

FOREIGN PATENTS 212,399    2/1958    Australia.

OTHER REFERENCES

Shell Technical Bulletin, Shell Chem. Co., Plastics and Resin Div., "Eponol 55 Resin," Feb. 7, 1962.

Shell Technical Bulletin, Shell Chem. Co., Plastics and Resin Div., "Eponol 55 Resin," Oct. 25, 1961, pp. 1–7.

EARL M. BERGERT, *Primary Examiner.*

HAROLD ANSHER, ALEXANDER WYMAN,
                                                     *Examiners.*